Figure 1:
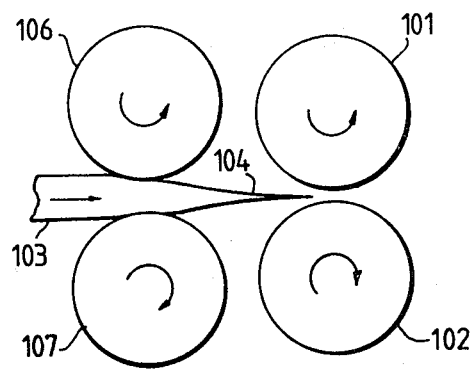

United States Patent [19]

Cowie et al.

[11] Patent Number: 4,481,693

[45] Date of Patent: Nov. 13, 1984

[54] METHOD AND APPARATUS FOR TREATING FISH CARCASSES FOR SEPARATING FLESH FROM FRAMES AND SKINS

[75] Inventors: William P. Cowie, Aberdeen; Drummond M. P. Lawrence; Morgan H. Goodlad, both of Aberdeenshire, all of Scotland

[73] Assignee: Internationale Octrooi Maatschappij "Octropa" B.V., Rotterdam, Netherlands

[21] Appl. No.: 311,286

[22] Filed: Oct. 14, 1981

[51] Int. Cl.³ .............................................. A22C 25/16
[52] U.S. Cl. ........................................ 17/46; 17/1 G; 17/56
[58] Field of Search .................... 17/1 G, 56, 46, 71, 17/73

[56] References Cited

U.S. PATENT DOCUMENTS 1,757,013 5/1930 Gallison .
1,793,189 2/1931 Peters ........................................ 17/56
2,987,759 6/1961 Lapeyre et al. ........................ 17/73
3,729,775 5/1973 McDonald .
3,947,921 4/1976 Berk ........................................ 17/71

FOREIGN PATENT DOCUMENTS 88214 10/1956 Norway .................................. 17/46
129787 10/1950 Sweden .................................. 17/56
137027 1/1920 United Kingdom .
736013 8/1955 United Kingdom .
1221197 2/1971 United Kingdom .

Primary Examiner—Willie G. Abercrombie
Attorney, Agent, or Firm—Cushman, Darby & Cushman

[57] ABSTRACT

Method for treating fish carcasses for separating flesh from frames and skins by a squeezing action of a pair of contra-rotating rollers between which decapitated and gutted fishes or tail sections of fishes are passed tail first. An apparatus for executing said method comprises at least two pairs of contra-rotatable rollers (209, 210, 212, 213) having parallel upright axes and each having at least a resilient surface, the first pair (209, 210), as viewed in the direction of transport, being at a greater mutual distance than the second pair (212, 213).

6 Claims, 5 Drawing Figures

METHOD AND APPARATUS FOR TREATING FISH CARCASSES FOR SEPARATING FLESH FROM FRAMES AND SKINS

Hitherto flesh was removed from fish carcasses by a cutting action, either manually or mechanically. Both methods are not feasible for treating small fishes. Accordingly, small fishes were previously comminuted and pressed through sieve means, thereby removing the bones but yielding an off-colour mince. The invention provides a method and apparatus for remedying this.

The invention provides a method for treating fish carcasses for separating flesh from frames and skins, in which process a decapitated and gutted fish carcass, which is unskinned and still contains the backbone, is passed tail-first between a pair of contra-rotating parallel squeeze rollers, the nip between which has such a width that the tail and the skin of said fish carcass is gripped sufficiently tightly for the skin and backbone of the fish to be drawn between the rollers without being significantly damaged, and while the fish carcass is being drawn between the squeeze rollers flesh is expressed from the head end thereof.

The invention also provides an apparatus in which the above process can be conducted, comprising a housing, feeding means for fish carcasses, treating means and discharging means, which apparatus is characterised in that the treating means comprise at least two pairs of contra-rotatably drivable parallel rollers having upright axes, the first pair of rollers, viewed in the direction of transport, being at a greater distance than the second pair of rollers, at least the second pair being coated with a resilient material having a profiled surface.

Although not absolutely necessary, it is highly desirable to have a second pair of rollers situated immediately in front of the squeeze rollers and rotated in a similar contrary manner relative to each other such that these rollers firstly guide the fish carcass into the nip between the squeeze rollers and secondly apply a light pre-squeezing action to the fish which loosens the bond between the flesh and the frame. This pre-squeezing facilitates the action of the squeeze rollers in expressing the flesh from the fish as already described. This second pair of rollers will hereafter be referred to as the "pre-squeezing rollers".

Although not essential, it is also desirable to have a further pair of rollers situated immediately behind the squeeze rollers and rotated in a similar contrary manner relative to each other, such that these rollers grip the tail of a fish carcass emerging from between the squeeze rollers and assist in the passage of the skin and frame of the fish carcass through the apparatus.

This further pair of rollers will hereinafter be referred to as the "discharge rollers".

An apparatus according to the invention can be provided with squeeze rollers plus pre-squeeze rollers, or with squeeze rollers plus discharge rollers or with a combination of all three types of rollers, as desired.

Although the squeeze rollers can be mounted in any orientation, it is nevertheless highly desirable that the nip between the squeeze rollers should lie in a vertical, or at least substantially vertical, plane. This feature is beneficial in assisting the recovery of the flesh expressed from the fish because the flesh will tend to drop away from the rollers rather than being caught between them.

A further desirable feature is a means for applying water either continuously or intermittently to the various pairs of rollers.

Application of the water can be, for example, by means of a jet or spray. The water assists in keeping the rollers clean and therefore maintaining their gripping qualities. It is generally desirable to ensure that excessive amounts of water do not become mixed with the flesh expressed from the fish carcass and therefore the provision of means for collecting and removing the water falling from the rollers is advantageous.

The squeeze rollers must have a degree of resilience sufficient to accommodate the naturally-varying cross-section of a typical fish carcass and to accommodate the variations in size from one fish carcass to another. We have found that in general the squeeze rollers should be made of a material having a hardness in the range 20 to 40 on the Shore scale. With this consideration in mind, the squeeze rollers are best made from natural or synthetic rubber having a hardness in this range.

The surface texture of the squeeze rollers must be such that sufficient friction can be generated between the roller surfaces and the skin of a fish carcass to draw the carcass between the rollers, while not causing any significant damage to the skin. A surface featuring a multitude of small closely-spaced indentations or projections is very suitable. Alternatively, a multitude of grooves or ribs, arranged for example parallel to the cylindrical axis of the roller, can be used. These surface features can be moulded into the material from which the bulk of the roller is constructed, or can be imparted to the roller by means of a surface covering.

The pre-squeeze discharge rollers can be constructed of similar materials with similar surface properties. We have found, however, that a relatively more frictional surface on the discharge rollers is beneficial.

The physical size of the squeeze rollers may be varied depending upon the physical size of the fish to be processed using the invention. The process of the invention can be readily adapted for small, intermediate or large fish. Clearly factors such as the physical size of the rollers, their positioning relative to one another, and the speed with which a carcass passes between the rollers may need adjustment according to the particular fish carcass being handled.

In general, we have found that the squeeze rollers should have a diameter in the range 30 to 90 mm and a length in the range 60 to 250 mm.

The pre-squeeze rollers should ideally have a length the same as that of the squeeze rollers. The diameter of the pre-squeeze rollers is preferably substantially greater than that of the squeeze rollers, thus promoting maximum fish-roller contact. In general we have found that the pre-squeeze rollers should have diameters in the range 70 to 120 mm.

The discharge rollers should ideally have a length the same as that of the squeeze rollers. The diameter of the discharge rollers, however, is preferably substantially less than that of the squeeze rollers so that close proximity between the two pairs of rollers can be obtained. In general we have found that the discharge rollers should have diameters in the range 30 to 60 mm.

Ideally the apparatus of the invention should be constructed such that the distance between the cylindrical axes of the squeeze rollers can be adjusted readily, thus making the apparatus better able to be used in the processing of a wide range of fish sizes. Preferably, the pre-squeeze rollers and the discharge rollers are similarly adjustable.

Preferably, the squeeze rollers should be in contact with each other. With rollers of hardness 20–40 and preferably 30–35 on the "A" Shore scale, and a diameter of 50 to 90 mm, the cylindrical axes can be set so that the rollers are just touching, the resilience of the rollers then providing for passage of a fish between them. The more resilient the rollers, the closer can be the cylindrical axes to produce an effective pressure on a fish carcass passing between the rollers.

Preferably, there is a gap between the pre-squeeze rollers, thus ensuring that their action on a carcass passing between them is merely a mild squeeze and does not cause any significant expression of flesh from the carcass in the manner intended during subsequent passage between the squeeze rollers. In general, this gap will be from about 2 to about 30 mm. The gap between the pre-squeeze rollers, when small fish such as blue whiting are being processed, will generally be about 4 to about 14 mm. For substantially larger fish, such as haddock, this gap will generally be about 16 to about 26 mm.

The discharge rollers should ideally be in contact with one another, to ensure that they grip adequately the tail of a fish carcass emerging from between the squeeze rollers, thus drawing the spent skin and skeleton of the fish carcass onwards through the apparatus.

The speed with which a fish carcass passes between the various pairs of rollers should be constant, or preferably increasing slightly as the carcass progresses through the apparatus. The speed of rotation of the rollers should be set accordingly. A typical throughput for small fish, such as blue whiting, fed continuously into the apparatus, can be up to about 100 pieces per minute, but a throughput of 25 to 50 pieces per minute would be more normal.

The extent to which relatively bone-free and skin-free flesh can be recovered from a fish carcass by means of the invention depends to a considerable extent on the quality of the fish used and the manner in which the fish has been treated and prepared prior to rolling. It is obviously essential that the head and gut regions of the fish should be removed prior to rolling. It is also useful if the dorsal fins of the fish are cut off, as we have found that this can result in a smoother passage of the carcass between the rollers and a lower incidence of backbone breakage. It can also be advantageous if the belly flaps of the fish are removed prior to rolling.

In the case of small fish such as blue whiting, small haddock, whiting and codling, the whole fish (minus head and guts) can be processed as a single unit. Due to their small size, such fish are difficult to process economically by conventional filleting operations conducted either mechanically or by hand. In the case of larger fish, for example cod, it can be advantageous to "halve" the fish into "top" (head) and "tail" portions. The top portion can be processed using conventional techniques to yield high quality fillet material. The intact tail portion, here also defined as a fish carcass, can be processed using the invention.

Figure 2:
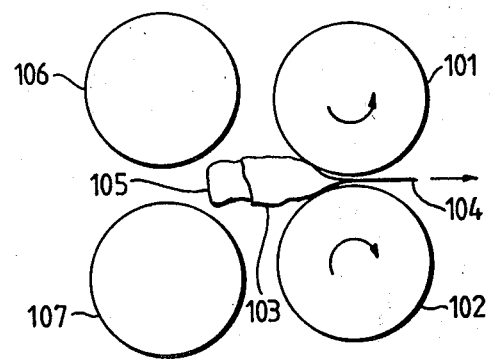
Figure 3:
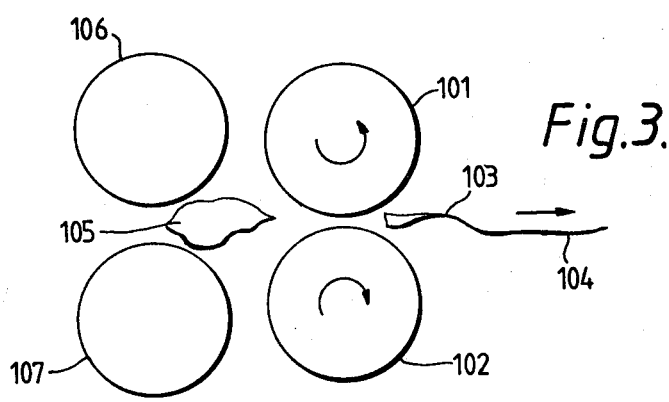
Figure 4:
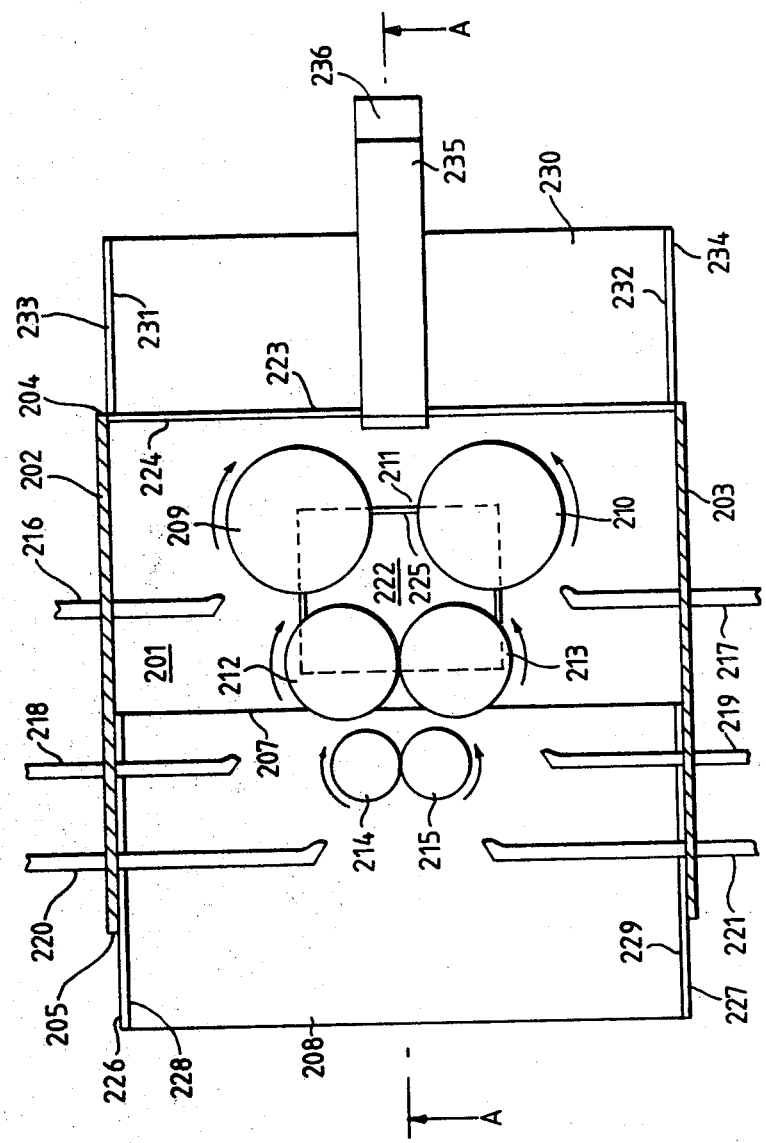
Figure 5:
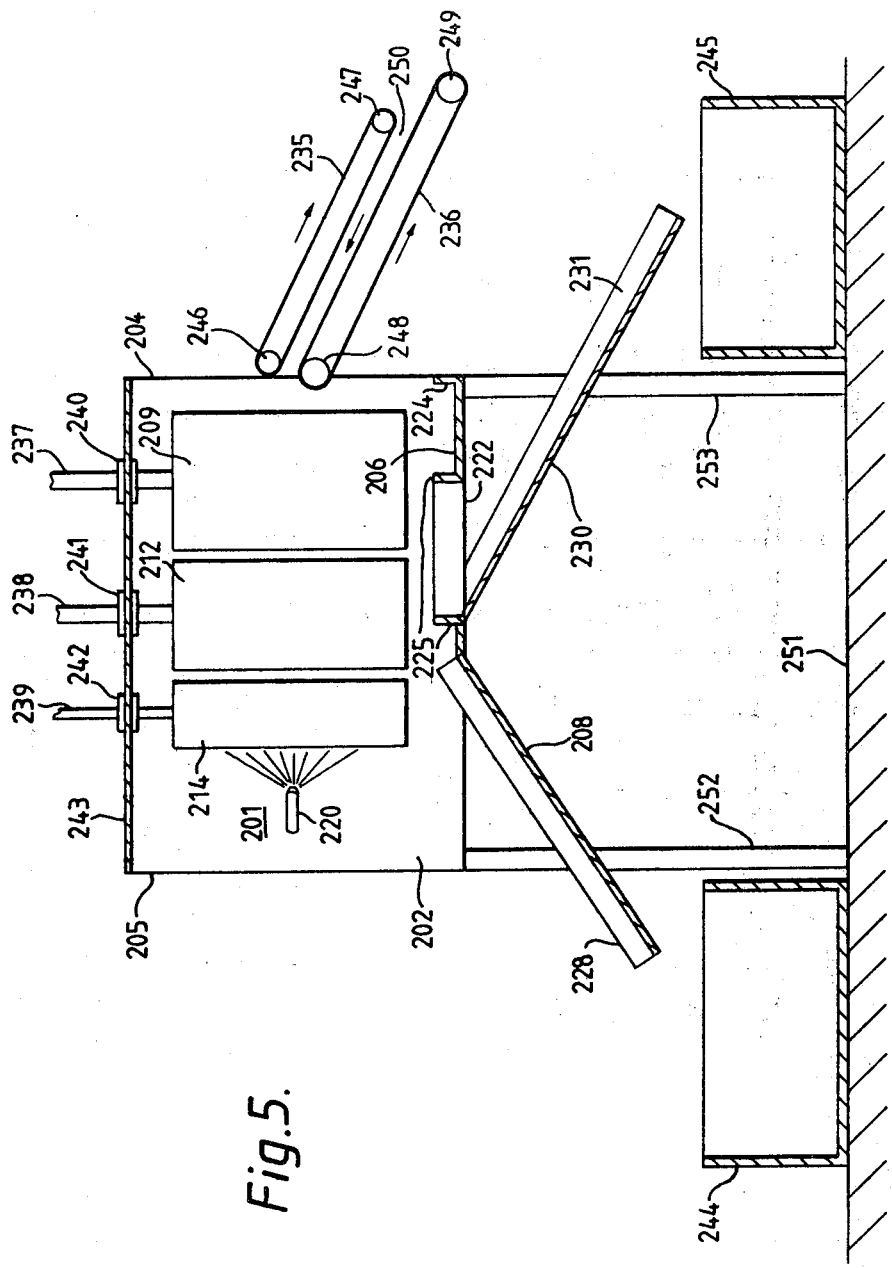

The invention will now be more particularly described with reference to the accompanying drawings, of which:

FIGS. 1, 2, and 3 illustrate diagramatically the passage of a fish carcass between a pair of contra-rotating rollers;

FIG. 4 represents a general plan view of a fish processing apparatus in accordance with the invention; and FIG. 5 represents a vertical cross-section of the apparatus depicted in FIG. 4 taken on the line AA shown in FIG. 4.

FIGS. 1 to 3 show a pair of parallel contra-rotating squeeze rollers 101 and 102, preceded by a pair of contra-rotating pre-squeeze rollers 106, 107, set at a wider nip distance, and illustrate the passage of a headed and gutted fish carcass 103 between the rollers. Tail 104 of carcass 103 is presented to the pre-squeeze rollers, and on being gripped between the rollers and thereby slightly pressed passes through in the direction indicated between the squeeze rollers 101, 102. As the bulk of carcass 103 contacts the squeeze rollers it is squeezed between them and the flesh 105 within the fish is expressed therefrom (FIG. 2).

FIG. 3 shows the final stage of the rolling procedure, with carcass 103 (now comprising essentially merely the skin and backbone structure) having passed completely between the rollers and the flesh 105 remaining in front of the rollers.

FIG. 4 is a plan view showing the general lay-out of a fish processing apparatus according to the invention. The apparatus comprises a rectangular chamber 201, of which side walls 202 and 203 can be seen in section. Ends 204 and 205 of chamber 201 are open. A horizontal floor 206 spans the entire width of chamber 201, and extends slightly over half the length of the chamber from forward end 204. From the rear edge 207 of floor 206, a sloping chute 208 leads downwardly and outwardly from chamber 201. Chute 208 also spans the entire width of chamber 201.

The apparatus is provided with a pair of parallel pre-squeeze rollers 209 and 210 mounted with their longitudinal axes vertical, the pair of rollers being adjacent the forward end 204 of chamber 201, and being symmetrically arranged on either side of the center line AA running through chamber 201. A narrow gap 211 exists between the pair of pre-squeeze rollers.

Immediately behind pre-squeeze rollers 209 and 210 are a pair of squeeze rollers 212 and 213, again mounted with their longitudinal axes vertical and similarly symmetrically arranged on either side of centre line AA. Squeeze rollers 212 and 213 contact one another. The diameter of squeeze rollers 212 and 213 is less than that of the pre-squeeze rollers 209 and 210. Behind squeeze rollers 212 and 213 are mounted a pair of discharge rollers 214 and 215, again with their longitudinal axes vertical and also symmetrically arranged on either side of centre line AA. Rollers 214 and 215 are also in contact with one another, and their diameters are less than those of squeeze rollers 212 and 213. Each roller is rotatable about its longitudinal axes in a contrary manner relative to its partner, and in such a manner that an object presented from forward end 204 of chamber 1 between the pre-squeeze rollers 209 and 210 will be drawn into chamber 201 and progressed in turn between the three pairs of rollers towards rear end 205.

A pair of water pipes 216 and 217 each terminating in a vertically-aligned V-jet spray head, lead into chamber 201 and are directed respectively against pre-squeeze rollers 209 and 210 such that water from the jets will impinge on the rear of each roller (relative to forward end 204 of chamber 201). A further pair of water pipes 218 and 219 lead into the apparatus and are directed via similar vertically-aligned V-jet spray heads against the rear of squeeze rollers 212 and 213. A third pair of water pipes 220 and 221 are similarly directed via similar spray heads against the rear of discharge rollers 214 and 215.

A rectangular aperture 222 exists in floor 206, and lies symmetrically beneath the pre-squeeze rollers 209 and 210, and the squeeze rollers 212 and 213 such that anything falling between the two pairs of rollers will drop below floor 206. Leading edge 223 of floor 206 is provided with an up-turned lip 224 which runs the entire width of the shelf. Another up-turned lip 225 runs round the entire edge of aperture 222. Side edges 226 and 227 of chute 208 are also provided with up-turned lips 228 and 229 respectively.

Below floor 206 is a second chute 230 which leads downwardly and outwardly from the front end 204 of chamber 201, commencing from the rear of aperture 222 such that anything falling through aperture 222 will land on chute 230 and be directed towards the front of the apparatus. Chute 230 is also provided with up-turned lips 231 and 232 along its side edges 233 and 234 respectively.

The apparatus is also provided with a feeder mechanism 235 comprising an upper continuous belt 236 and a lower continuous belt 227 arranged in parallel one above the other along centre line AA at the forward end 204 of chamber 201. Lower belt 236 extends further from the chamber than does the upper belt.

Referring to FIG. 5, which illustrates a vertical cross-section of the apparatus taken on centre line AA shown in FIG. 4, rollers 209, 212 and 214 can be seen within chamber 201. Each roller is mounted on a vertical shaft 237, 238 and 239 respectively, running through bearings 240, 241 and 242 respectively, situated in the roof 243 of chamber 201. The shafts are connected to a motor means (not shown) capable of causing rotation of each roller in the manner already described in relation to FIG. 4. Water jet 220 playing onto the back of rollers 214 can also be seen.

Floor 206 with aperture 222 and rim 225 can be seen, as also can the two sloping chutes 208 and 230. The sloping chutes are depicted as leading down to trays 244 and 245 respectively, capable of catching any material sliding down each chute. The two continuous belts 235 and 236 comprising the feeder mechanism can also be seen. Belt 235 runs round a pair of horizontally mounted rollers 246 and 247. Belt 236 runs round a similar pair of horizontally mounted rollers 248 and 249.

The belts lead upwards into the open end 204 of chamber 201 adjacent the gap 211 between the pair of pre-squeeze rollers 209 and 210. A narrow gap 250 exists between the two belts along their entire adjacent length. The belts 235 and 236 can be driven via their respective rollers by a motor means (not shown), such that they run in a contrary manner and any material placed between the belts will be drawn between them upwards into the apparatus. The whole apparatus is depicted as standing on ground 251 by means of legs mounted one at each corner, only the farther two of which legs (252 and 253) can be seen in this cross-section.

In operation, the three pairs of rollers within the apparatus are set in rotational motion and the belts are also set running. Water is fed via the inlet pipes to the jets and played onto the rear of each roller. Headed and gutted but otherwise whole fish carcasses are fed tail first between the two belts, which convey the carcasses upwards into the gap 211 between the pre-squeeze rollers 209 and 210, which apply relatively gentle pressure to each fish carcass and soften up the muscle structure. The continuous rotation of the pre-squeeze rollers progresses the fish carcass towards the pair of squeeze rollers 212 and 213 which tightly grip the tail of the fish and draw the fish carcass between them. As the tail of the carcass emerges from between the squeeze rollers it is engaged between the discharge rollers 214 and 215 which actively continue the progress of the carcass through the apparatus. As the fish carcass passes between the squeeze rollers it is subject to considerable pressure, and the flesh within the carcass is separated from the skin and bone structure and is extruded from the head end of the carcass. The extruded flesh falls through aperture 222 onto forwardly sloping chute 230, and slides down into the waiting tray 245. The spent skin and bone structure of the carcass is discharged from the apparatus after passing between the discharge rollers by sliding down rearwardly sloping chute 208 into the other waiting tray 244. The continuous jets of water played onto the rollers help in keeping each roller clean of fish flesh and slime from the fish skin, and thereby ensuring that the rollers maintain an adequate grip on each carcass and that the valuable fish flesh collected in tray 245 is not unduly contaminated with unwanted low-grade material. The water from each jet cascades down each roller onto floor 206 and then down rear chute 208. The up-turned lips 224 and 225 around the leading edge 223 of floor 206 and around aperture 222 help to prevent undue amounts of water becoming mixed with the valuable fish flesh.

An additional or alternative means of ensuring that the fish flesh collected does not have an excessive water content, is to use a foraminous material, such as an expanded metal screen, as the floor of the chute 230. Water can fall through the holes while the fish flesh slides down the chute into the waiting tray 245.

EXAMPLE

An apparatus according to the invention and basically as just described with reference to FIGS. 4 and 5, was used to recover flesh from blue whiting.

The apparatus had the following technical specification.

The pre-squeeze rollers were constructed of rubber having a hardness of 30 on the Shore scale, moulded onto 20 mm stainless steel shafts. Each roller had a length of 150 mm and a diameter of 90 mm. A textured surface, comprising a non-slip vinyl sheet material recommended for use as a deck covering for yachts, was bonded to each roller. A gap of 5 mm existed between the pre-squeeze rollers.

The squeeze rollers were of identical construction to the pre-squeeze rollers, except that they had a diameter of 70 mm, and were just in contact with one another.

The discharge rollers were constructed of rubber having a hardness of 35 on the Shore scale, moulded onto 15 mm diameter stainless steel shafts. Each roller had a length of 150 mm and a diameter of 40 mm. They were covered with the same non-slip material and were just in contact with one another.

Gutted frozen-at-sea blue whiting were thawed, and headed manually. 200 kilos of fish were processed in the apparatus in 1 hour 45 minutes, and 70 kilos of acceptable flesh recovered, giving a yield of 35%.

We claim:

1. Apparatus for treating fish carcasses for separating flesh from frames and skins, comprising a housing, a pair of contra-rotatably drivable parallel squeeze rollers in said housing and means for feeding fish carcasses through the nip between said squeeze rollers to express the flesh from the fish carcass, the improvement wherein the squeeze rollers are arranged with their axes in a vertical position so as to provide a vertical nip, said squeeze rollers are coated with a resilient material having a profiled surface, a first pair of contra-rotating pre-squeeze rollers which are also vertically disposed to provide a vertical nip wider than the nip between the squeeze rollers, said pre-squeeze rollers preceding the pair of squeeze rollers, when viewed in the direction of transport, and being positioned close enough to the squeeze rollers that fish carcasses fed into and through the nip of the pre-squeeze rollers are guided into the nip of the squeeze rollers, a further paid of contra-rotating, vertically disposed rollers providing a vertical nip adjacent the exit from the nip of the squeeze rollers positioned to receive material passing through the nip of said squeeze rollers and draw the material away therefrom, and means provided below the nip of said squeeze rollers to collect expressed flesh.

2. The apparatus of claim 1, characterised in that the rollers are only supported at their upper extremity.

3. The apparatus of claim 1, characterised in that the squeeze rollers have a diameter in the range of 30 to 90 mm and the pre-squeeze rollers have a diameter in the range of 70 to 120 mm.

4. The apparatus of claim 1, characterised in that the squeeze rollers have a surface hardness of 20 to 40 and preferably 30 to 35 on the "A" Shore scale.

5. A method for treating decapitated and gutted but otherwise whole fish carcasses which are unskinned and include the fish backbone or frame so as to separate flesh from the frame and skin, which comprises providing a first pair of contra-rotating, parallel, resiliently surfaced, profiled squeeze rollers having vertically disposed axes, positioning the rollers to provide a nip therebetween having an entrance side and an exit side, the nip being such that the tail and skin of the fish carcass are gripped sufficiently tightly to be drawn between the squeeze rollers without being significantly damaged while flesh is expressed from the carcass, providing a second pair of contra-rotating, parallel pre-squeeze rollers which are also vertically disposed to provide a vertical nip which has an entrance side and an exit side, said second pair of rollers being spaced to provide a slightly wider nip than the nip between the first pair of rollers, said second pair of rollers also being positioned sufficiently close to the first pair so that fish carcasses fed into the entrance side of the nip of the second pair of rollers pass out of the exit side of the nip of said second pair of rollers and are guided directly into the nip between the first pair of rollers, providing a third pair of contra-rotating, vertically disposed rollers having a nip which is adapted to draw the fish carcass directly from the exit side of the hip of the first pair of rollers and has a width such that the tail and backbone of the fish carcass can be tightly engaged without breaking, passing the decapitated and gutted but otherwise whole fish carcass tail first between the nip of said second pair of rollers and then directly through the nip of said first pair of rollers whereby the tail and skin of the carcass are drawn through the nip of said first pair of rollers while the flesh of the fish carcass is expressed from the head end of the carcass at the entrance side of the nip of said first pair of rollers, collecting the expressed flesh at a point below the entrance side of the nip of said first pair of rollers, passing the remaining fish frame and skin through the nip of said first pair of rollers and then directly through the nip of the third pair of rollers and separately collecting the fish frame and skin after they exit the nip of said third pair of rollers.

6. The method of claim 5, characterised in that the dorsal fins and the belly flaps are removed prior to passing the fish carcasses between the rollers.

* * * * *